(12) United States Patent
Sim et al.

(10) Patent No.: US 8,994,664 B2
(45) Date of Patent: Mar. 31, 2015

(54) TOUCH SCREEN PANEL AND FABRICATION METHOD THEREOF

(75) Inventors: Jae-Yun Sim, Yongin (KR); Dong-Min Kim, Yongin (KR); Deuk-Soo Shin, Yongin (KR); Sang-Joon Choi, Yongin (KR); Soung-Chang Ku, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1191 days.

(21) Appl. No.: 12/926,116

(22) Filed: Oct. 27, 2010

(65) Prior Publication Data

US 2011/0227840 A1    Sep. 22, 2011

(30) Foreign Application Priority Data

Mar. 16, 2010 (KR) .................. 10-2010-0023240

(51) Int. Cl.
  *G06F 3/041* (2006.01)
  *G06F 3/044* (2006.01)

(52) U.S. Cl.
  CPC ...... *G06F 3/044* (2013.01); *G06F 2203/04111* (2013.01)
  USPC .......................................................... 345/173

(58) Field of Classification Search
  CPC ......... H03K 17/975; H01H 1/02; H01H 1/10; H01H 9/00
  USPC ................. 200/600, 511, 512, 310–317, 292; 345/173
  See application file for complete search history.

(56) References Cited

U.S. PATENT DOCUMENTS

| | | | | |
|---|---|---|---|---|
| 8,279,201 | B2 * | 10/2012 | Kang et al. | 345/176 |
| 8,450,628 | B2 * | 5/2013 | Yau et al. | 200/600 |
| 2008/0264699 | A1 | 10/2008 | Chang et al. | |
| 2008/0309635 | A1 | 12/2008 | Matsuo | |
| 2009/0244021 | A1 * | 10/2009 | Matsuo et al. | 345/173 |

(Continued)

FOREIGN PATENT DOCUMENTS

| | | |
|---|---|---|
| JP | 2008-310550 A | 12/2008 |
| JP | 2010-009456 A | 1/2010 |

(Continued)

OTHER PUBLICATIONS

Japanese Office action dated Jun. 12, 2012 for Japanese Patent Application No. 2010-153984 (Jae-Yun Sim, et al.).

(Continued)

*Primary Examiner* — Edwin A. Leon
*Assistant Examiner* — Anthony R. Jimenez
(74) *Attorney, Agent, or Firm* — Lee & Morse, P.C.

(57) ABSTRACT

A touch screen panel includes a transparent substrate divided into a display area and a non-display area, the non-display area being outside the display area, first sensing cells disposed in one row with a same X-coordinate in the display area, the first sensing cells having a double-layered structure including first and second sensing cell parts overlapping each other, a connection portion between adjacent first sensing cells, second sensing cells disposed in one column with a same Y-coordinate in the display area, the second sensing cells having a double-layered structure including third and fourth sensing cell parts overlapping each other, a connection pattern between adjacent second sensing cells, the connection pattern intersecting and overlapping the connection portion, and an island-shaped insulating layer between the connection portion and the connection pattern.

20 Claims, 7 Drawing Sheets

(56) References Cited

U.S. PATENT DOCUMENTS

2010/0134436 A1 6/2010 Jeong et al.
2010/0182255 A1 7/2010 Jeong et al.

FOREIGN PATENT DOCUMENTS

| KR | 10-2008-0096352 A | 10/2008 |
| KR | 10 2009-0131149 A | 12/2009 |
| KR | 10-2010-0061993 A | 6/2010 |
| KR | 10-2010-0084261 A | 7/2010 |

OTHER PUBLICATIONS

Korean Office Action in KR 10-2010-0023240, dated Nov. 30, 2011 (Sim, et al.).

* cited by examiner

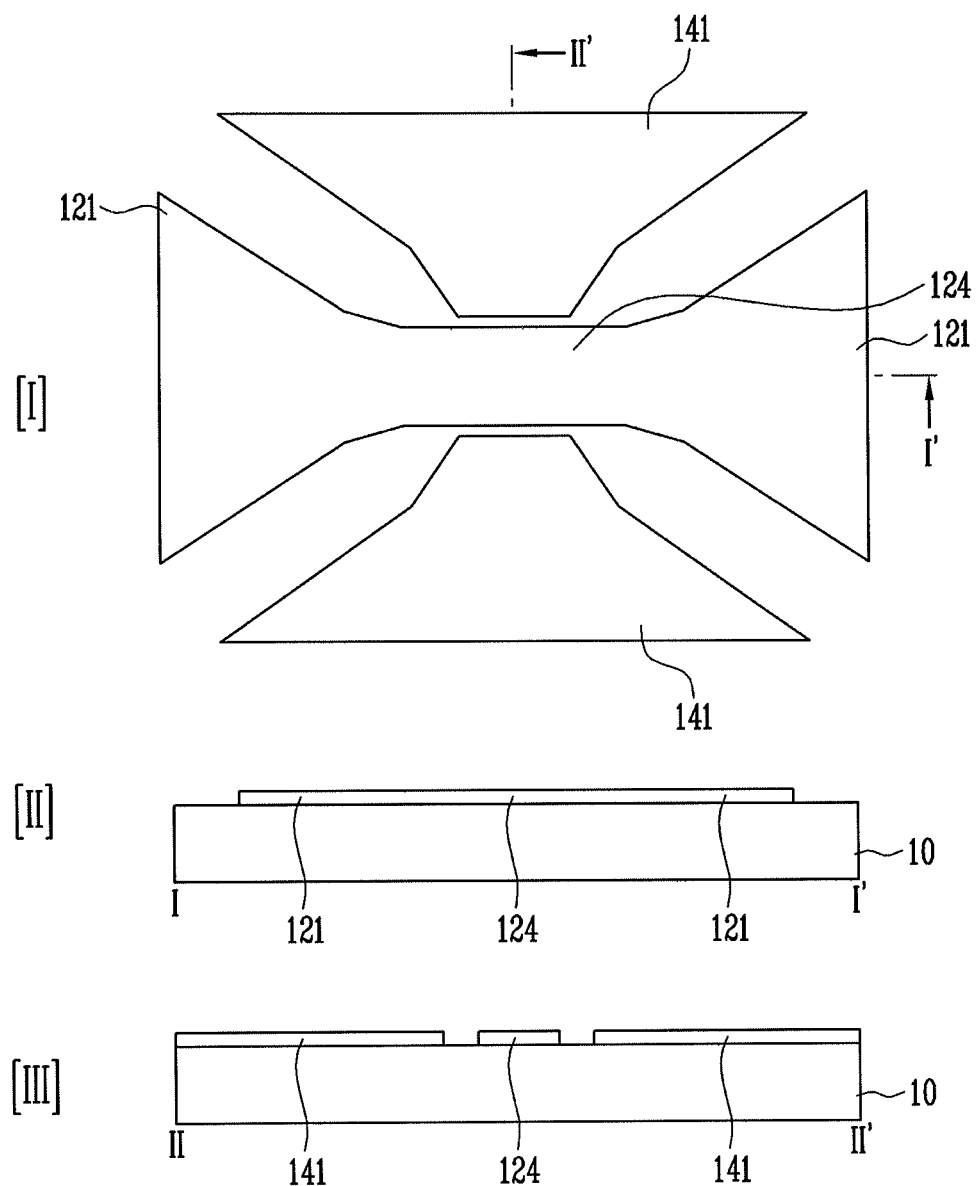

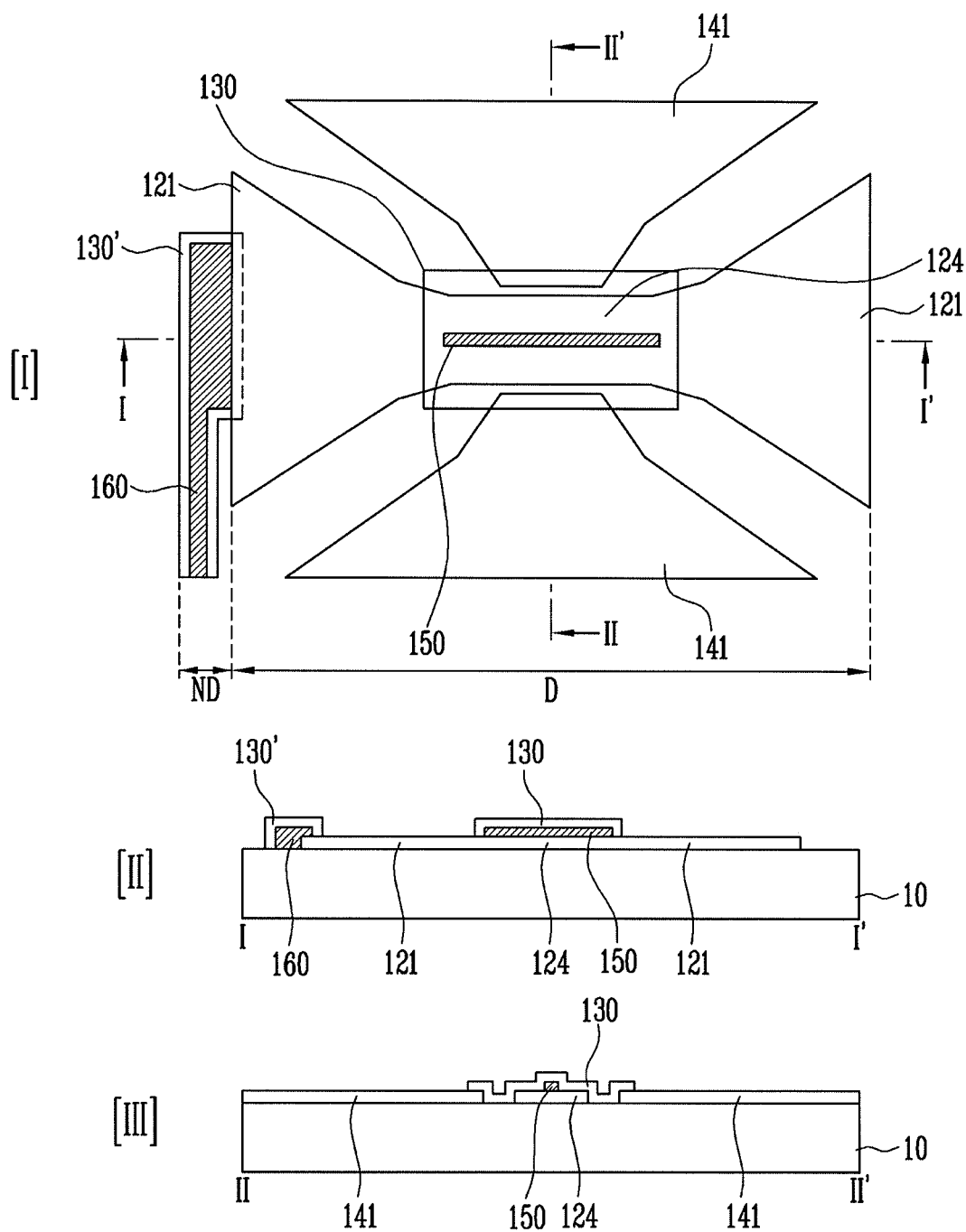

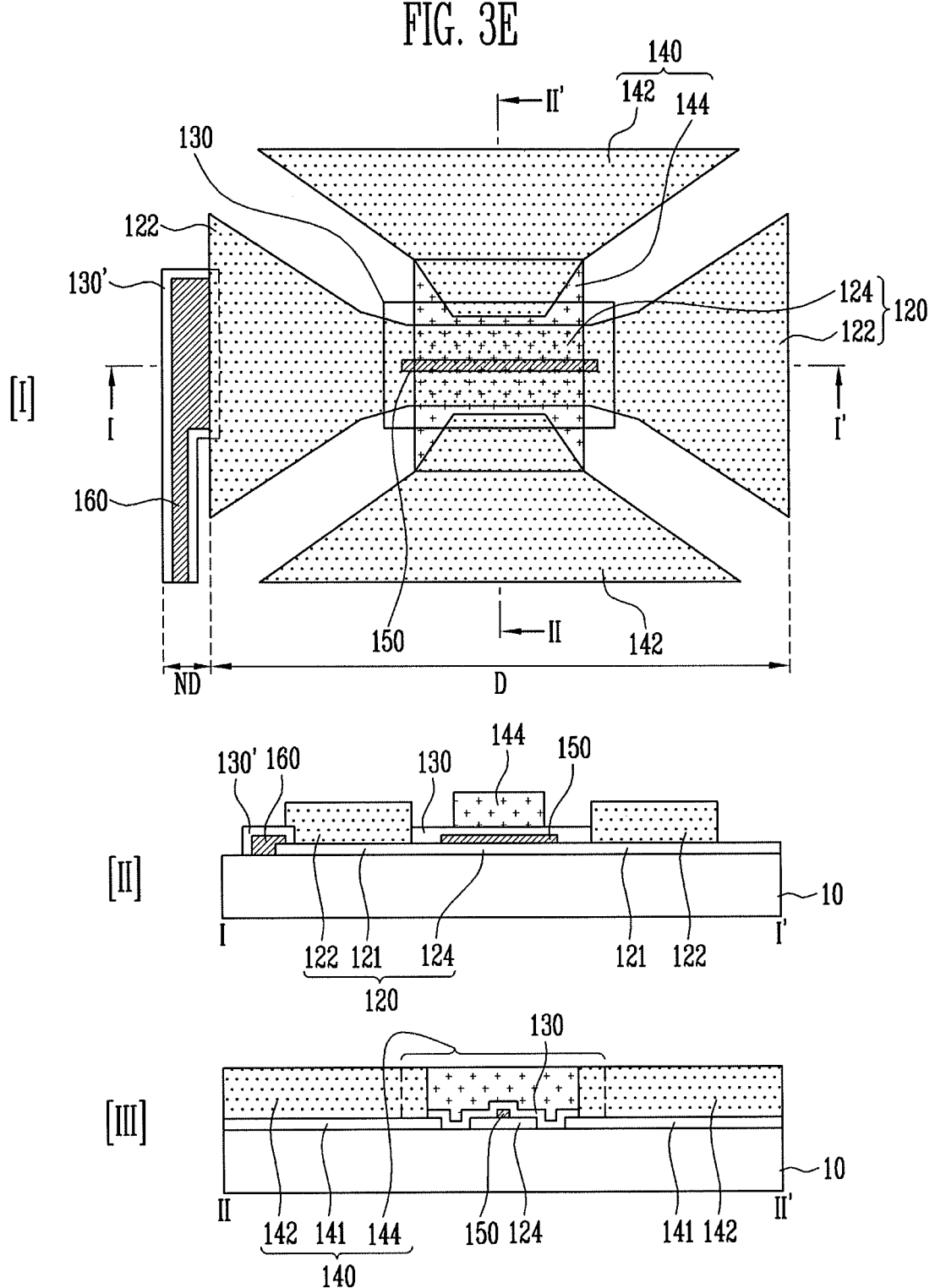

TOUCH SCREEN PANEL AND FABRICATION METHOD THEREOF

BACKGROUND

1. Field

Example embodiments relate to a touch screen panel, and more particularly, to a touch screen panel integrally formed with an upper substrate of a flat panel display device and a fabrication method thereof.

2. Description of the Related Art

A touch screen panel is an input device that allows a user's instruction to be input by selecting an instruction content displayed on a screen, e.g., an image display device, with the user's hand or object. Since such a touch screen panel can be substituted for a separate input device connected to an image display device, such as a keyboard or a mouse, its application fields have been gradually extended.

The touch screen panel may be formed on a front face of the image display device to convert a contact position of the user's hand or object into an electrical signal. Here, the user's hand or object may be in direct contact with the touch screen panel at the contact position. Accordingly, the instruction content selected at the contact position is input as an input signal to the image display device.

Touch screen panels may be divided into resistive overlay touch screen panels, photosensitive touch screen panels, capacitive touch screen panel, and the like. For example, a capacitive touch screen panel converts a contact position into an electrical signal by sensing a change in capacitance formed between a conductive sensing pattern and an adjacent sensing pattern, ground electrode or the like, when a user's hand or object is in contact with the touch screen panel. In order to clearly detect a contact position at a contact surface, a conventional capacitive touch screen panel may include first sensing patterns (X patterns) connected along a first direction and second sensing patterns (Y patterns) connected along a second direction.

SUMMARY

Embodiments are directed to a touch screen panel and a fabrication method thereof, which substantially overcome one or more of the problems due to the limitations and disadvantages of the related art.

It is therefore a feature of an embodiment to provide a touch screen panel and a fabrication method having poly-crystalline ITO first and second sensing cells with a thick amorphous ITO connection pattern therebetween, thereby decreasing the resistance of the connection pattern and reducing static electricity thereon.

At least one of the above and other features and advantages may be realized by providing a touch screen panel, including a transparent substrate divided into a display area and a non-display area, the non-display area being outside the display area, first sensing cells disposed in one row with a same X-coordinate in the display area, the first sensing cells having a double-layered structure including first and second sensing cell parts overlapping each other, a connection portion between adjacent first sensing cells, second sensing cells disposed in one column with a same Y-coordinate in the display area, the second sensing cells having a double-layered structure including third and fourth sensing cell parts overlapping each other, a connection pattern between adjacent second sensing cells, the connection pattern intersecting and overlapping the connection portion, and an island-shaped insulating layer between the connection portion and the connection pattern.

The first and third sensing cell parts may be in a same plane, the first and third sensing cell parts including poly-crystalline indium tin oxide with a thickness of about 200 Å to about 300 Å.

The second and fourth sensing cell parts may be in a same plane, the second and fourth sensing cell parts including poly-crystalline indium tin oxide with a thickness of about 700 Å to about 1200 Å.

The connection portion may be integral with the first sensing cell parts of the first sensing cells.

A portion of the connection pattern overlapping the insulating layer may include amorphous indium tin oxide having a thickness of about 700 Å to about 1200 Å. A portion of the connection pattern overlapping edges of the third sensing cell parts of the second sensing cells may include poly-crystalline indium tin oxide.

The touch screen panel may further include a metal pattern in the non-display area, the metal pattern being electrically connected to the first or second sensing cell positioned at an end of the display area.

The touch screen panel may further include an auxiliary pattern on the connection portion, the auxiliary pattern including a low-resistance metal.

At least one of the above and other features and advantages may be realized by providing a fabrication method of a touch screen panel, including forming first sensing cells in one row with a same X-coordinate in a display area of a transparent substrate, the first sensing cells having a double-layered structure including first and second sensing cell parts overlapping each other, forming a connection portion between adjacent first sensing cells, forming second sensing cells in one column with a same Y-coordinate in the display area, the second sensing cells having a double-layered structure including third and fourth sensing cell parts overlapping each other, forming a connection pattern between adjacent second sensing cells, the connection pattern intersecting and overlapping the connection portion, and forming an island-shaped insulating layer between the connection portion and the connection pattern.

The fabrication method may further include depositing amorphous indium-tin-oxide on first and third sensing cell parts and the island-shaped insulating layer, such that the amorphous indium-tin-oxide is transformed into poly-crystalline indium-tin-oxide in regions contacting the first and third sensing cell parts, and etching remaining amorphous indium-tin-oxide, except in regions overlapping the insulating layer and edges of the third sensing cell parts, to form the connection pattern. Depositing the amorphous indium-tin-oxide may include depositing amorphous indium-tin-oxide on the entire transparent substrate to a thickness of about 700 Å to about 1200 Å.

The second and fourth sensing cell parts may be formed of poly-crystalline indium-tin-oxide in regions overlapping the first and third sensing cell parts, respectively.

The first sensing cell parts, the connection portion, and the third sensing cell parts may be formed to have a thickness of about 200 Å to about 300 Å.

A portion of the connection pattern overlapping the insulating layer may be formed of amorphous indium-tin-oxide, and a portion of the connection pattern overlapping edges of the third sensing cell parts may be formed of poly-crystalline indium-tin-oxide.

The fabrication method may further include forming a metal pattern in the non-display area, the metal pattern being electrically connected to the first or second sensing cells positioned at an end of the display area.

The fabrication method may further include forming an auxiliary pattern of a low-resistance metal on the connection portion.

BRIEF DESCRIPTION OF THE DRAWINGS

The above and other features and advantages will become more apparent to those of ordinary skill in the art by describing in detail exemplary embodiments with reference to the attached drawings, in which:

FIGS. 3A to 3E illustrate plan and sectional views of stages in a fabrication method of a touch screen panel according to an embodiment.

DETAILED DESCRIPTION

Figure 1A:
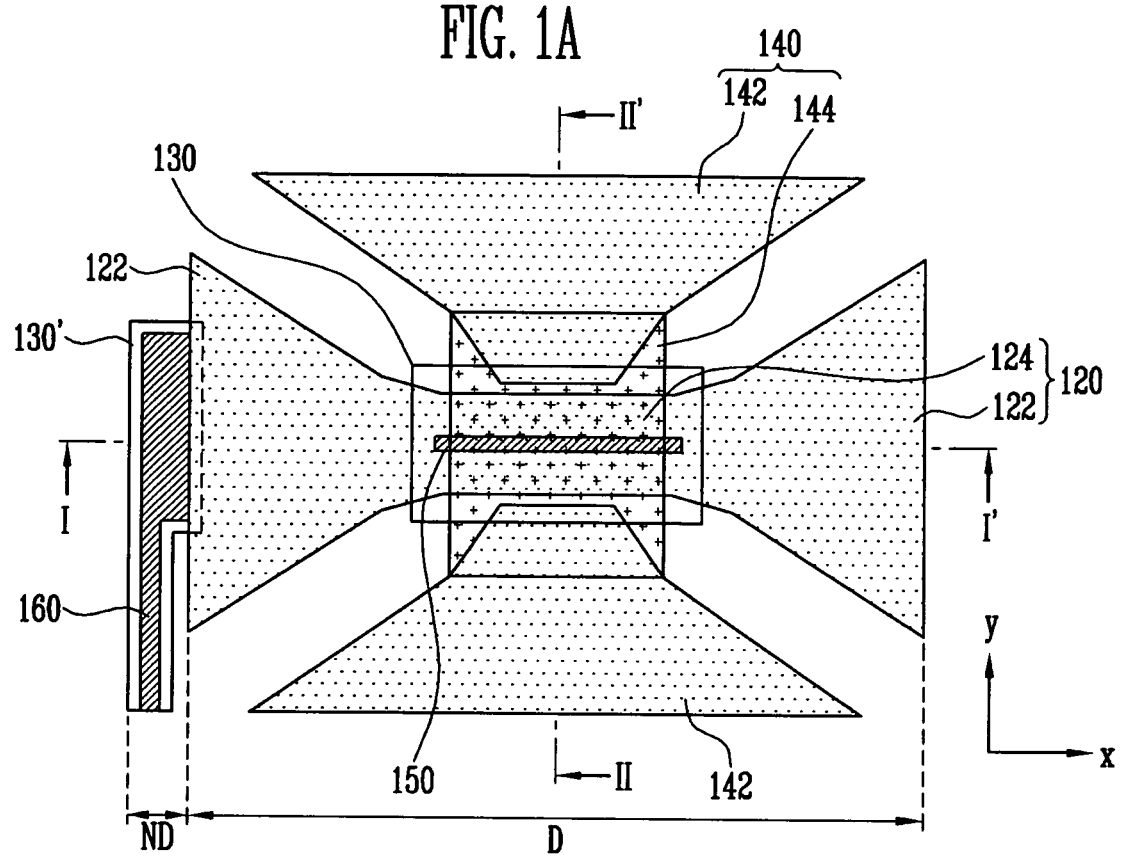
FIG. 1A illustrates a plan view of an arrangement of sensing patterns in a touch screen panel according to an embodiment.

Korean Patent Application No. 10-2010-0023240, filed on Mar. 16, 2010, in the Korean Intellectual Property Office, and entitled: "Touch Screen Panel and Fabrication Method Thereof" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Also, when a layer is referred to as being "connected to" another layer, it can be directly connected to the other layer or be indirectly connected to the other layer with one or more intervening layers therebetween. Like reference numerals refer to like elements throughout.

Figure 1B:
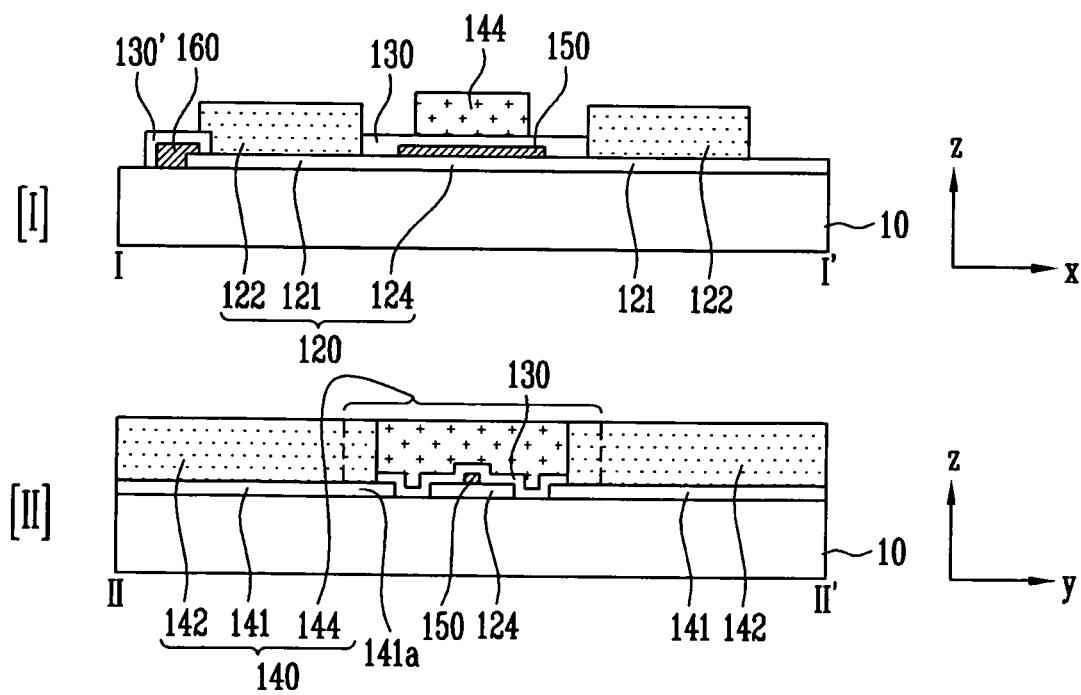
FIG. 1B illustrates cross-sectional views along lines I-I' and II-II' in FIG. 1A.

FIG. 1A illustrates a plan view of an arrangement of sensing patterns formed in a touch screen panel according to an embodiment. FIG. 1B (I) illustrates a cross-sectional view along line I-I' of FIG. 1A, and FIG. 1B (II) illustrates a cross-sectional view along line II-II' of FIG. 1A. Here, among a plurality of first and second sensing patterns disposed on a display area, 2×2 sensing patterns positioned at one end of the display area will be described as an example.

Referring to FIGS. 1A and 1B, a touch screen panel according to an embodiment may include a display area D on a transparent substrate 10, a non-display area ND on the transparent substrate 10 outside an outline of, e.g., external to, the display area D, and sensing patterns in the display area D of the transparent substrate 10. The sensing patterns may be alternately disposed and include first and second sensing patterns 120 and 140 formed to be connected to each other along one row with a same X-coordinate or one column with a same Y-coordinate.

That is, as illustrated in FIG. 1B (I), the first sensing patterns 120 may include first sensing cells with a double-layered structure, i.e., first and second sensing cell parts 121 and 122. The first sensing cells may be disposed in one row with the same X-coordinate, and a connection portion 124 may connect the first sensing cells to each other. The second patterns 140, as illustrated in FIG. 1B (II), may include second sensing cells with a double-layered structure, i.e., third and fourth sensing cell parts 141 and 142. The second sensing cells may be disposed in one column with the same Y-coordinate, and a connection pattern 144 may connect the second sensing cells to each other.

In detail, as illustrated in FIGS. 1B(I) and 1B(II), the first sensing cell parts 121, i.e., the (1-1)-th sensing cells 121, may be positioned at a lower portion among the first sensing cells 121 and 122 with the double-layered structure, and the third sensing cell parts 141, i.e., (2-1)-th sensing cells 141, may be positioned at a lower portion among the second sensing cells 141 and 142 with the double-layered structure. The first and third sensing cell parts 121 and 141 may be formed in a same plane, e.g., directly on the transparent substrate 10, in an alternating pattern. The (1-1)-th sensing cells 121 and the (2-1)-th sensing cells 141, i.e., the first and third sensing cell parts 121 and 141, may be formed of a transparent conductive material, e.g., poly-crystalline indium-tin oxide (poly-ITO). It is noted that, hereinafter, the "first and second sensing cell parts 121 and 122" will be used interchangeably with the "(1-1)-th and (1-2)-th sensing cells 121 and 122," respectively. Similarly, the "third and fourth sensing cell parts 141 and 142" will be used interchangeably with the "(2-1)-th and (2-2)-th sensing cells 141 and 142," respectively.

Further, as illustrated in FIGS. 1B(I) and 1B(II), the second sensing cell parts 122, i.e., the (1-2)-th sensing cells 122, may be positioned at an upper portion among the first sensing cells 121 and 122 with the double-layered structure, and the fourth sensing cell parts 142, i.e., the (2-2)-th sensing cells 142, may be positioned at an upper portion among the second sensing cells 141 and 142 with the double-layered structure. The (1-2)-th and (2-2)-th sensing cells 122 and 142 may be positioned to overlap the (1-1)-th sensing cells 121 and the (2-1)-th sensing cells 141, respectively. In other words, the second and fourth sensing cell parts 122 and 142 may be formed on, e.g., directly on, the first and third sensing cell parts 121 and 141, respectively, to define the double layered structures of the first and second sensing patterns 120 and 140. Therefore, the first and third sensing cell parts 121 and 141 may be between the transparent substrate 10 and respective second and fourth sensing cell parts 122 and 144, such that the second and fourth sensing cell parts 122 and 144 may overlap respective first and third sensing cell parts 121 and 141.

The (1-2)-th sensing cells 122 and the (2-2)-th sensing cells 142 may be formed of a transparent conductive material, e.g., poly-crystalline indium-tin oxide (poly-ITO). In detail, the (1-2)-th sensing cells 122 and the (2-2)-th sensing cells 142 may be formed by depositing amorphous indium-tin oxide (a-ITO), which transform into poly-ITO in regions overlapping, e.g., contacting, the poly-ITO of the (1-1)-th sensing cells 121 and the (2-1)-th sensing cells 141. That is, when a-ITO is deposited on poly-ITO, the a-ITO is poly-crystallized, as grains of the poly-ITO positioned at a lower portion among the a-ITO and the poly-ITO, i.e., below the a-ITO, are grown upward. Such growth of a single crystalline layer having an isotropic property is referred to as epitaxial growth or epitaxy. Accordingly, in example embodiments, the first sensing cells 121 and 122 and the second sensing cells 141 and 142 may be formed of poly-ITO with a double-layered structure.

The (1-1)-th sensing cells 121 and the (2-1)-th sensing cells 141 may be formed to have a thickness of about 200 Å to about 300 Å along the z-axis. The (1-2)-th sensing cells 122 and the (2-2)-th sensing cells 142 may be formed to have a thickness of about 700 Å to about 1200 Å along the z-axis.

In order for the first sensing cells 121 and 122 and the second sensing cells 141 and 142 to serve as sensing electrodes, the first and second sensing cells may be arranged in respective first and second directions, and may be electrically connected to each other. Accordingly, the first sensing cells 121 and 122 may be electrically connected to each other by the connection portion 124, and the second sensing cells 141 and 142 may be electrically connected to each other by the connection pattern 144.

In detail, as illustrated in FIGS. 1A and 1B(I), the connection portion 124 may be integrally formed with the (1-1)-th sensing cells 121, so adjacent (1-1)-th sensing cells 121 may be connected to each other through the connection portion 124. That is, the connection portion 124 may be formed of a same material as the (1-1)-th sensing cell 121, i.e., the poly-ITO, on the transparent substrate 10. Therefore, the connection portion 124 may be formed to have a same thickness as the (1-1)-th sensing cell 121, e.g., about 200 Å to about 300 Å.

Further, as illustrated in FIGS. 1A and 1B(II), the connection pattern 144 may allow adjacent second sensing cells 141 and 142 to be electrically connected to each other therethrough while being separated from the adjacent second sensing cells 141 and 142. That is, since the (1-1)-th sensing cells 121, the connection portion 124, and the (2-1)-th sensing cells 141 are formed in the same layer, the connection pattern 144 intersected with the connection portion 124 cannot be formed in the same layer as the (1-1)-th sensing cells 121 and the (2-1)-th sensing cells 141. Accordingly, in an embodiment, the connection pattern 144 may be formed in an upper layer of, i.e., above, the connection portion 124.

An island-shaped insulating layer 130 may be formed in the region between the connection pattern 144 and the connection portion 124, intersected and overlapped with each other. Here, the insulating layer 130 may be an inorganic insulating layer made of a transparent material, e.g., a silicon oxide layer ($SiO_2$) and/or a silicon nitride layer ($SiN_x$).

The connection pattern 144 may be formed of a-ITO through the same process as the (1-2)-th sensing cells 122 and the (2-2)-th sensing cells 142. As described above, the (1-2)-th sensing cells 122 and the (2-2)-th sensing cells 142 may be respectively formed in regions contacting the poly-ITO (1-1)-th sensing cells 121 and the (2-1)-th sensing cells 141. Therefore, the a-ITO of the (1-2)-th sensing cells 122 and the (2-2)-th sensing cells 142 is changed into poly-ITO through epitaxial growth. Since the a-ITO connection pattern 144 does not contact poly-ITO, i.e., as the insulating layer 130 is formed between the connection portion 124 and the connection pattern 144, the connection pattern 144 may remain in a state of a-ITO. In particular, as illustrated in FIG. 1B(II), the connection pattern 144 may be poly-crystallized in regions contacting edges 141a of the (2-1)-th sensing cells 141 (dotted regions in the figures), while remaining in an amorphous state in a region contacting the insulating layer 130 (regions indicated by 'x' in FIGS. 1B(I) and 1B(II)).

The connection pattern 144, the (1-2)-th sensing cells 122, and the (2-2)-th sensing cells 142 may be formed to have a substantially same thickness, e.g., about 700 Å to about 1200 Å. That is, the thickness of the connection pattern 144 through which the second sensing cells 141 and 142 are connected to each other may be sufficiently thick, thereby decreasing the resistance of the connection pattern 144 and reducing static electricity thereon. Accordingly, it may be possible to overcome the problem of electrostatic discharge (ESD).

As further illustrated in FIGS. 1A and 1B(I), a metal pattern 160 for supplying signals sensed by the sensing cells to a drive circuit (not shown) may be formed in the non-display area ND adjacent to an end of the display area D in which the first sensing cells 121 and 122 and the second sensing cells 141 and 142 are formed. An island-shaped insulating layer 130' may be formed on the metal pattern 160. The insulating layer 130' may be identical to the insulating layer 130 described previously, i.e., an inorganic insulating layer made of, e.g., a silicon oxide layer ($SiO_2$) or a silicon nitride layer ($SiN_x$).

That is, an area, in which the plurality of sensing patterns 120 and 140 are formed, is a display area in which an image is displayed to detect a touch position. The area, in which the metal patterns 160 electrically connected to the sensing patterns 120 and 140 are formed, is a non-display area ND formed outside the outline of the display area D.

As further illustrated in FIGS. 1A and 1B(I)-1B(II), an auxiliary pattern 150 made of the same material as the metal pattern 160 may be formed on the connection portion 124 through which the first sensing cells 121 and 122 are connected to each other. The auxiliary pattern 150 may decrease the resistance of the connection portion 124. For example, the metal pattern 160 and the auxiliary pattern 150 may be formed of a low-resistance metal. Examples of the low-resistance metal may be molybdenum (Mo), silver (Ag), titanium (Ti), copper (Cu), aluminum (Al), molybdenum/aluminum/molybdenum (Mo/Al/Mo) or the like.

According to embodiments, the sensing cells may be formed of poly-ITO with a double-layered structure. The thickness of the lower sensing cells 121 and 141 may be about 200 Å to about 300 Å, and the thickness of the upper sensing cells 122 and 142 may be about 700 Å to about 1200 Å. Therefore, the thickness of the entire sensing cell may be about 900 Å to about 1500 Å.

Figure 2:
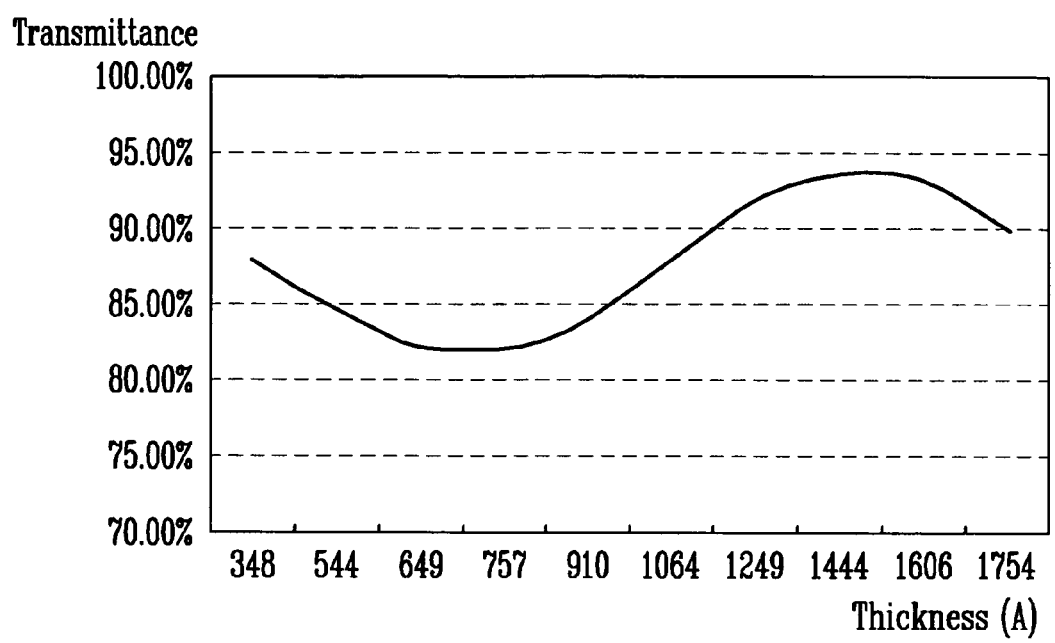
FIG. 2 illustrates a graph showing transmittance with respect to thickness of a poly-ITO.

FIG. 2 illustrates a graph showing transmittance with respect to thickness of a poly-ITO. In FIG. 2, the horizontal axis denotes the thickness (Å) of the poly-ITO, and the vertical axis denotes the transmittance (%) of the poly-ITO. Referring to FIG. 2, it can be seen that the poly-ITO has a maximum transmittance at the thickness of about 1500 Å.

That is, in the range from about 350 Å to about 900 Å, the transmittance of the poly-ITO is decreased as the thickness of the poly-ITO is increased. However, in the range from about 900 Å to about 1500 Å, the transmittance of the poly-ITO is increased as the thickness of the poly-ITO is increased. Thus, in example embodiments, the thickness of the entire sensing cell may be formed to be about 900 Å to about 1500 Å, thereby enhancing the transmittance.

FIGS. 3A to 3E illustrate plan and sectional views of stages in a fabrication method of the touch screen panel shown in FIG. 1. It is noted that each figure of FIGS. 3A to 3E illustrates three views, i.e., one plan view labeled with Roman numeral (I) and two cross-sectional views labeled with Roman numerals (II) and (III), corresponding to FIGS. 1A, 1B(I), and 1B(II), respectively. Here, among a plurality of first and second sensing patterns disposed on a display area, 2×2 sensing patterns positioned at one end of the display area will be described as an example.

First, referring to FIG. 3A, the (1-1)-th sensing cells 121, the connection portion 124 through which the (1-1)-th sensing cells 121 are connected to each other, and the (2-1)-th sensing cells 141 may be formed in the display area of the transparent substrate 10. The (1-1)-th sensing cells 121 and the (2-1)-th sensing cells 141 may be formed in the same layer through the same process. The sensing cells 121 and 141 may be formed of poly-ITO as a transparent conductive material so as to implement the operation of the touch screen panel.

In order for the (1-1)-th sensing cells 121 and the (2-1)-th sensing cells 141 to serve as sensing electrodes, sensing cells respectively arranged in X and Y directions may be electrically connected to one another. Accordingly, the (1-1)-th sensing cells 121 may be electrically connected to each other by the connection portion 124, and the (2-1)-th sensing cells 141 may be electrically connected to each other by the connection pattern 144 to be formed later.

As illustrated in FIG. 3A, the connection portion 124 may be integrally formed with the (1-1)-th sensing cells 121, so adjacent (1-1)-th sensing cells 121 may be all connected through the connection portion 124. That is, the connection portion 124 may be formed of the same transparent conductive material in the same layer through the same process as the (1-1)-th sensing cell 121. As further illustrated in FIG. 3A, the (1-1)-th sensing cells 121 may be arranged adjacent to each other along a first direction, and the (2-1)-th sensing cells 141 may be arranged adjacent to each other along a second direction perpendicular to the first direction. Further, the (2-1)-th sensing cells 141 may be spaced apart from the connection portion 124 along the second direction. In an embodiment, the (1-1)-th sensing cells 121, the connection portion 124, and the (2-1)-th sensing cells 141 may be formed to have a thickness of about 200 Å to about 300 Å.

Subsequently, referring to FIG. 3B, the metal pattern 160 may be formed on the transparent substrate 10 to be electrically connected to the (1-1)-th sensing cell 121 or (2-1)-th sensing cell 141. The metal pattern 160 may be formed at one end, i.e., at an edge, of the display area D. It is noted that illustration of the metal pattern 160 in FIG. 3 at the left edge of the display area is only exemplary.

Here, the transparent substrate 10 may be divided into the display area D and the non-display area ND formed outside of the outline of the display area D. The metal pattern 160 may be formed in the non-display area ND adjacent to the (1-1)-th sensing cell 121 positioned at the left end of the display area. The metal pattern 160 supplies signals sensed by the (1-1)-th sensing cells 121 to the drive circuit (not shown).

Figure 3B:
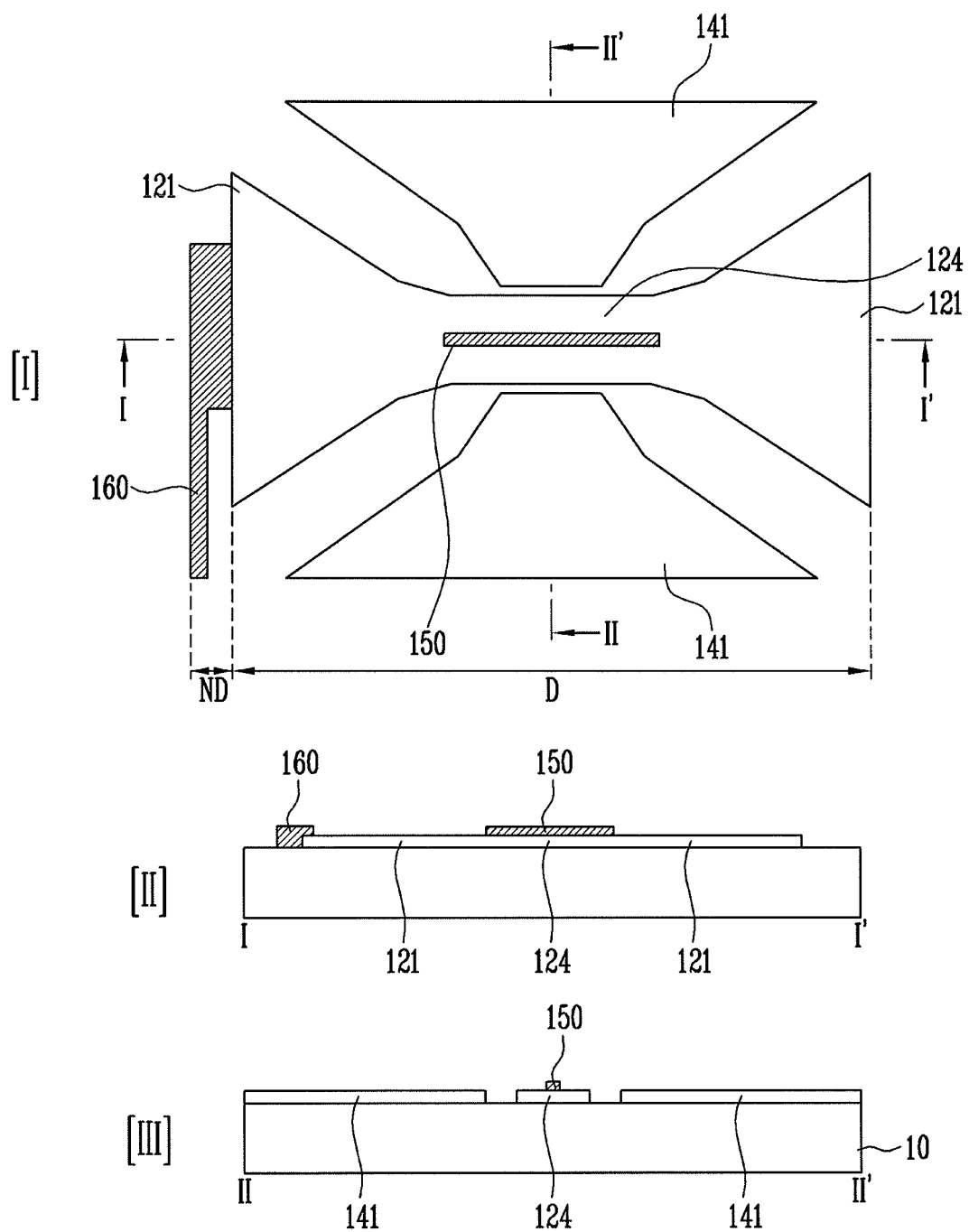

As further illustrated in FIG. 3B, the auxiliary pattern 150 made of the same material as the metal pattern 160 may be formed on the connection portion 124 through which the (1-1)-th sensing cells 121 are connected to each other. The auxiliary pattern 150 functions to decrease the resistance of the connection portion 124. For example, the metal pattern 160 and the auxiliary pattern 150 may be formed of a low-resistance metal, e.g., molybdenum (Mo), silver (Ag), titanium (Ti), copper (Cu), aluminum (Al), molybdenum/aluminum/molybdenum (Mo/Al/Mo) or the like.

Subsequently, referring to FIG. 3C, island-shaped insulating layers 130' and 130 may be formed on, e.g., to overlap, the metal pattern 160 and the auxiliary pattern 150, respectively. The insulating layers 130' and 130 may be inorganic insulating layers made of a transparent material, e.g., a silicon oxide layer ($SiO_2$) or a silicon nitride layer ($SiN_x$).

For example, the island-shaped insulating layer 130 formed on the connection portion 124 may completely overlap the auxiliary pattern 150. That is, the insulating layer 130 may be formed to completely cover the connection portion 124 and the auxiliary pattern 150. It is noted, as illustrated in FIG. 3C, that the insulating layer 130 may fill regions on the transparent substrate 10 between the connection portion 124 and the (2-1)-th sensing cell 141, and may overlap a portion of an upper surface of the (2-1)-th sensing cells 141.

Subsequently, referring to FIG. 3D, a-ITO 200 may be deposited on the transparent substrate 10 on which the (1-1)-th sensing cells 121, the (2-1)-th sensing cells 141, and the island-shaped insulating layer 130 are formed. The a-ITO 200 may completely cover the (1-1)-th sensing cells 121, the (2-1)-th sensing cells 141, and the insulating layer 130. In an embodiment, the a-ITO 200 may be deposited to have a thickness of about 700 Å to about 1200 Å.

As the a-ITO 200 overlaps and contacts the (1-1)-th sensing cells 121 and the (2-1)-th sensing cells 141, which are formed of poly-ITO, portions of the a-ITO 200 contacting the poly-ITO change into poly-ITO 202 (dotted regions in figures) through epitaxial growth, i.e., epitaxy. The epitaxial growth or epitaxy refers to growth in which, when a-ITO is deposited on poly-ITO, the a-ITO is poly-crystallized as grains of the poly-ITO positioned at a lower portion among the a-ITO and the poly-ITO are grown upward. Portions 204 and 204' of the a-ITO 200 (regions in the figures indicated by 'x') not contacting the poly-ITO may remain in an amorphous state, i.e., portions 204 and 204' may be defined in regions other than the poly-ITO 202. That is, the a-ITO 200 deposited on the insulating layer 130 formed on the connection portion 124 may remain in an amorphous state, i.e., portions 204 and 204'.

Figure 3D:
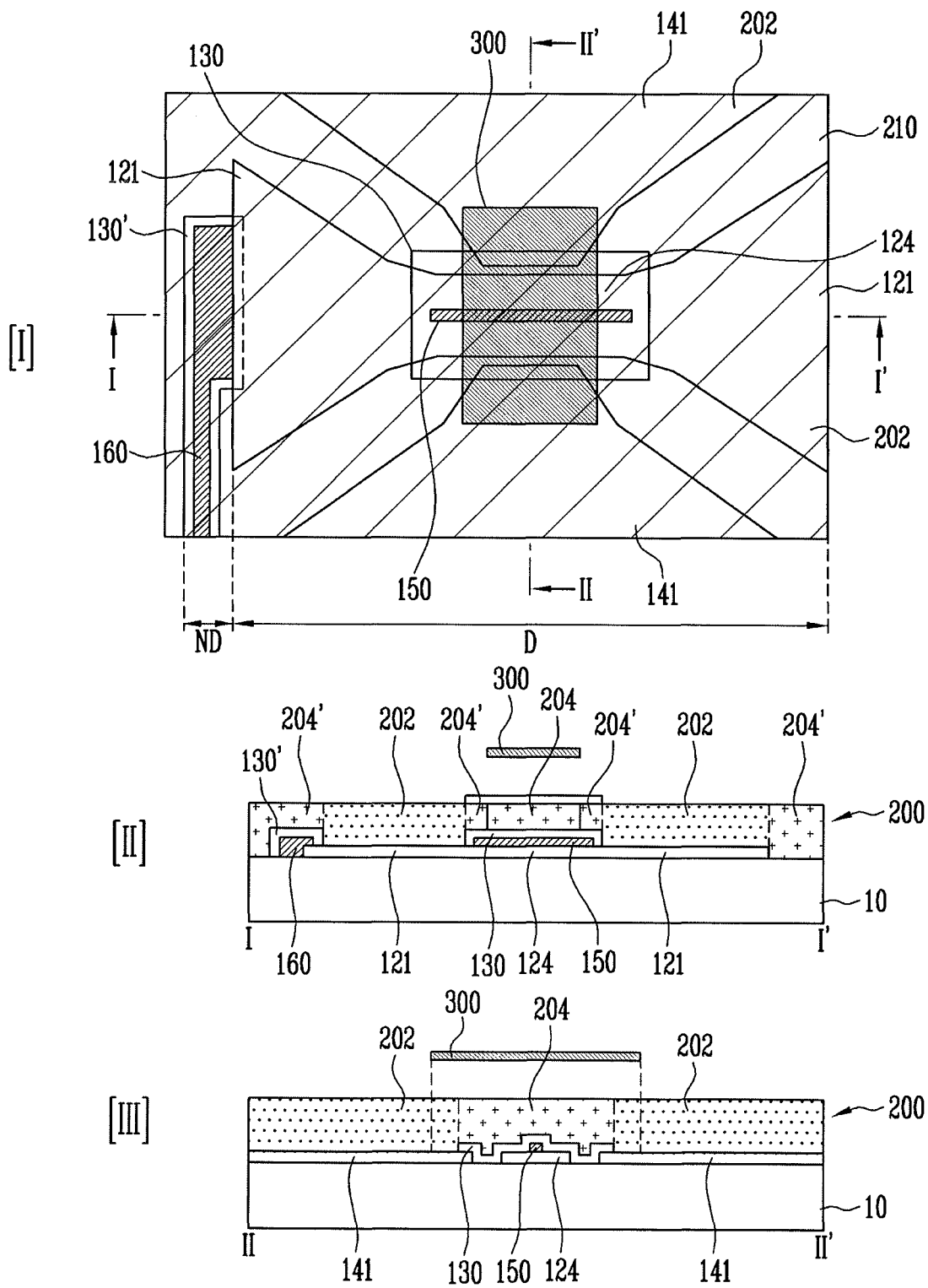

As further illustrated in FIG. 3D, in order to form the connection pattern through which the (2-1)-th sensing cells 141 are electrically connected to each other as described above, a mask 300 may be positioned to correspond to the region in which the a-ITO 200 is overlapped with the insulating layer 130 and ends of the (2-1)-th sensing cells 141. Next, the a-ITO 200 formed in the region outside the mask 300, i.e., a region surrounding the mask 300, may be etched, e.g., removed.

At this time, a chromium (Cr) etchant may be used as an example of the etchant for etching the a-ITO 200. The chromium etchant may not etch poly-ITO but only a-ITO. Thus, when the a-ITO 200 is etched with the chromium etchant using the mask 300, the a-ITO 200 transformed into the poly-ITO 202 over the (1-1)-th sensing cells 121 and the (2-1)-th sensing cells 141 is not etched. That is, portions 204' of a-ITO that are not covered by the mask 300 may be etched using the chromium etchant. For example, portions 204' formed in regions 210, i.e., between the (1-1)-th sensing cells 121 and the (2-1)-th sensing cells 141, and on parts of the insulating layer 130 not covered by the mask 300 may be etched using the chromium etchant.

Accordingly, if the etching process using the chromium etchant is performed, the connection pattern 144 may be formed in the region overlapping mask 300, as shown in FIG. 3E. In other words, as illustrated in FIG. 3E, the connection pattern 144 may be poly-crystallized in the region overlapping the edges of the (2-1)-th sensing cells 141, but may maintain an amorphous state in the region overlapping the insulating layer 130 and the mask 300.

In this case, the thickness of the connection pattern 144 may be identical to that of the a-ITO 200 described in FIG. 2D. Therefore, the thickness of the connection pattern 144 may be about 700 Å to about 1200 Å. That is, the thickness of the connection pattern 144 through which the (2-1)-th sensing cells 141 are connected to each other may be formed to be sufficiently thick, thereby decreasing the resistance of the connection pattern 144 and reducing its static electricity. Accordingly, it may be possible to overcome the problem of ESD.

In example embodiments, as shown in FIG. 3E, a poly-crystallized ITO may further be formed on the (1-1)-th sensing cells 121 and the (2-1)-th sensing cells 141, which are formed of poly-ITO. Thus, the first and second sensing cells may be formed of poly-ITO with a double-layered structure.

Consequently, in example embodiments, the first and second sensing patterns 120 and 140 may be formed in the display area D of the transparent substrate 10. The first sensing patterns 120 may include the first sensing cells 121 and 122 with a double-layered structure, disposed on one row with the same X-coordinate, and the connection portion 124 through which the first sensing cells 121 and 122 are connected to each other. The second patterns 140 may include the second sensing cells 141 and 142 with a double-layered structure, disposed on one column with the same Y-coordinate, and the connection pattern 144 through which the second sensing cells 141 and 142 are connected to each other.

In example embodiments, the (1-1)-th sensing cells 121 positioned at a lower portion among the first sensing cells 121 and 122 with the double-layered structure and the (2-1)-th sensing cells 141 positioned at a lower portion among the second sensing cells 141 and 142 with the double-layered structure may be formed in the same layer. The (1-1)-th sensing cells 121 and the (2-1)-th sensing cells 141 may be formed of poly-ITO as a transparent conductive material.

The (1-2)-th sensing cells 122 positioned at an upper portion among the first sensing cells 121 and 122 with the double-layered structure and the (2-2)-th sensing cells 142 positioned at an upper portion among the second sensing cells 141 and 142 with the double-layered structure may be positioned in regions in which they are overlapped with the (1-1)-th sensing cells 121 and the (2-1)-th sensing cells 141, respectively. The (1-2)-th sensing cells 122 and the (2-2)-th sensing cells 142 may be initially formed by depositing a-ITO, but the a-ITO formed in the regions in which they are respectively overlapped with the (1-1)-th sensing cells 121 and the (2-1)-th sensing cells 141 may then be changed into poly-ITO. Consequently, the (1-2)-th sensing cells 122 and the (2-2)-th sensing cells 142 may be formed of poly-ITO.

As described above, according to example embodiments, a thick a-ITO connection pattern may be formed to connect adjacent first or second sensing cells, thereby decreasing the resistance of the connection pattern and minimizing build up of electric charge, i.e., static electricity, on a surface of the connection pattern. Accordingly, it may be possible to overcome a problem of ESD.

In contrast, when conventional first and second sensing patterns are formed of a transparent, conductive material and are disposed in different layers, e.g., when the first sensing patterns are positioned in a lower layer and the second sensing patterns are positioned in an upper layer, with an insulating layer therebetween, a surface resistance of the transparent sensing patterns may be large. Further, if a width of a connection portion between sensing patterns in a same layer is increased to decrease the surface resistance, an overlapping area of the connection portions in the different layers, i.e., upper and lower, may be increased, thereby increasing the capacitance of the overlapping area. As such, sensitivity of each of the sensing patterns may be lowered.

In another example, when conventional first and second layers are formed in the same layer, a separate connection pattern may be formed through a contact hole in an insulating layer positioned on the first sensing patterns to connect the sensing patterns. However, if the connection portion is formed of a transparent conductive material, the resistance may be relatively high, and if a metallic connection portion is formed on the insulating layer, static electricity may be high.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A touch screen panel, comprising:
    a transparent substrate divided into a display area and a non-display area, the non-display area being outside the display area;
    first sensing cells disposed in one row with a same X-coordinate in the display area, the first sensing cells having a double-layered structure including first and second sensing cell parts overlapping each other;
    a connection portion between adjacent first sensing cells;
    second sensing cells disposed in one column with a same Y-coordinate in the display area, the second sensing cells having a double-layered structure including third and fourth sensing cell parts overlapping each other;
    a connection pattern between adjacent second sensing cells, the connection pattern intersecting and overlapping the connection portion, and a thickness of the connection pattern being larger than twice a thickness of the connection portion; and
    an island-shaped insulating layer between the connection portion and the connection pattern.

2. The touch screen panel as claimed in claim 1, wherein the first and third sensing cell parts are in a same plane, the first and third sensing cell parts including poly-crystalline indium tin oxide with a thickness of about 200 Å to about 300 Å.

3. The touch screen panel as claimed in claim 2, wherein the second and fourth sensing cell parts are in a same plane, the second and fourth sensing cell parts including poly-crystalline indium tin oxide with a thickness of about 700 Å to about 1200 Å.

4. The touch screen panel as claimed in claim 1, wherein the connection portion is a single layer integral only with the first sensing cell parts of the first sensing cells among the first through fourth sensing cell parts.

5. The touch screen panel as claimed in claim 3, wherein a portion of the connection pattern overlapping the insulating layer includes amorphous indium tin oxide having a thickness of about 700 Å to about 1200 Å.

6. The touch screen panel as claimed in claim 5, wherein a portion of the connection pattern overlapping edges of the third sensing cell parts of the second sensing cells includes poly-crystalline indium tin oxide.

7. The touch screen panel as claimed in claim 1, further comprising a metal pattern in the non-display area, the metal pattern being electrically connected to the first or second sensing cell positioned at an end of the display area.

8. The touch screen panel as claimed in claim 1, further comprising an auxiliary pattern on the connection portion, the auxiliary pattern including a low-resistance metal.

9. A fabrication method of a touch screen panel, comprising:
    forming first sensing cells in one row with a same X-coordinate in a display area of a transparent substrate, the first sensing cells having a double-layered structure including first and second sensing cell parts overlapping each other;
    forming a connection portion between adjacent first sensing cells;
    forming second sensing cells in one column with a same Y-coordinate in the display area, the second sensing cells having a double-layered structure including third and fourth sensing cell parts overlapping each other;

forming a connection pattern between adjacent second sensing cells, the connection pattern intersecting and overlapping the connection portion; and forming an island-shaped insulating layer between the connection portion and the connection pattern, wherein forming the connection pattern includes:

depositing amorphous indium-tin-oxide on first and third sensing cell parts and the island-shaped insulating layer, such that the amorphous indium-tin-oxide is transformed into poly-crystalline indium-tin-oxide in regions contacting the first and third sensing cell parts, and etching remaining amorphous indium-tin-oxide, except in regions overlapping the insulating layer and edges of the third sensing cell parts, forms the connection pattern.

10. The fabrication method as claimed in claim 9, wherein depositing the amorphous indium-tin-oxide includes depositing amorphous indium-tin-oxide on the entire transparent substrate to a thickness of about 700 Å to about 1200 Å.

11. The fabrication method as claimed in claim 9, wherein the second and fourth sensing cell parts are formed of poly-crystalline indium-tin-oxide in regions overlapping the first and third sensing cell parts, respectively.

12. The fabrication method as claimed in claim 9, wherein the first sensing cell parts, the connection portion, and the third sensing cell parts are formed to have a thickness of about 200 Å to about 300 Å.

13. The fabrication method as claimed in claim 9, wherein a portion of the connection pattern overlapping the insulating layer is formed of amorphous indium-tin-oxide, and a portion of the connection pattern overlapping edges of the third sensing cell parts is formed of poly-crystalline indium-tin-oxide.

14. The fabrication method as claimed in claim 9, further comprising forming a metal pattern in a non-display area, the metal pattern being electrically connected to the first or second sensing cells positioned at an end of the display area.

15. The fabrication method as claimed in claim 9, further comprising forming an auxiliary pattern of a low-resistance metal on the connection portion.

16. The touch screen panel as claimed in claim 1, wherein the connection pattern overlaps and contacts lateral surfaces of the second sensing cells, the lateral surfaces of the second sensing cells being perpendicular to the transparent substrate.

17. The touch screen panel as claimed in claim 16, wherein the connection pattern overlaps and contacts directly only the lateral surfaces of the second sensing cells among all the surfaces of the second sensing cells, and a top surface of the connection pattern faces away from the transparent substrate and is substantially level with top surfaces of the second sensing cells.

18. The touch screen panel as claimed in claim 1, wherein the second sensing cells extend above a top surface of the island-shaped insulating layer, the island-shaped insulating layer directly contacting only lateral surfaces of the second sensing cells among all surfaces of the second sensing cells.

19. The touch screen panel as claimed in claim 1, wherein a thickness of each of the fourth sensing cell parts and the connection pattern is larger than twice a thickness of each of the first sensing cell parts and the connection portion.

20. The touch screen panel as claimed in claim 1, wherein the connection portion includes:

a first portion overlapping the insulating layer; and a second portion continuous with the first portion and overlapping the third sensing cell parts, the first and second portions of the connection portion having different crystallization states.

* * * * *